US008387064B2

(12) United States Patent
Archer et al.

(10) Patent No.: US 8,387,064 B2
(45) Date of Patent: Feb. 26, 2013

(54) BALANCING A DATA PROCESSING LOAD AMONG A PLURALITY OF COMPUTE NODES IN A PARALLEL COMPUTER

(75) Inventors: Charles J. Archer, Rochester, MN (US); Amanda E. Peters, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1140 days.

(21) Appl. No.: 12/248,568

(22) Filed: Oct. 9, 2008

(65) Prior Publication Data

US 2010/0095303 A1 Apr. 15, 2010

(51) Int. Cl.
*G06F 9/455* (2006.01)
*G06F 15/16* (2006.01)
(52) U.S. Cl. .................................. 718/105; 709/224
(58) Field of Classification Search .................. None
See application file for complete search history.

(56) References Cited

U.S. PATENT DOCUMENTS

| 7,487,243 | B1 * | 2/2009 | Zielinski et al. ............. 709/226 |
| 7,498,243 | B2 | 2/2009 | Zielinkski et al. | |
| 7,865,686 | B2 * | 1/2011 | Akimoto ........................ 711/170 |
| 2002/0107903 | A1 | 8/2002 | Richter et al. | |
| 2002/0107962 | A1 | 8/2002 | Richter et al. | |
| 2002/0107971 | A1 | 8/2002 | Bailey et al. | |
| 2004/0196496 | A1 * | 10/2004 | Klassen ......................... 358/1.15 |
| 2008/0025298 | A1 * | 1/2008 | Lev-Ran et al. ............... 370/389 |
| 2009/0313635 | A1 * | 12/2009 | Dasdan .......................... 718/105 |

OTHER PUBLICATIONS

Final Office Action, U.S. Appl. No. 11/553,101, mail date Mar. 31, 2010.
Office Action, U.S. Appl. No. 11/553,101, mail date Mar. 31, 2010.
Notice of Allowance, U.S. Appl. No. 12/147,073, mail date Sep. 22, 2011.

* cited by examiner

*Primary Examiner* — Kenneth Tang
(74) *Attorney, Agent, or Firm* — Biggers & Ohanian, LLP

(57) ABSTRACT

Methods, apparatus, and products are disclosed for balancing a data processing load among a plurality of compute nodes in a parallel computer that include: partitioning application data for processing on the plurality of compute nodes into data chunks; receiving, by each compute node, at least one of the data chunks for processing; estimating, by each compute node, processing time involved in processing the data chunks received by that compute node for processing; and redistributing, by at least one of the compute nodes to at least one of the other compute nodes, a portion of the data chunks received by that compute node in dependence upon the processing time estimated by that compute node.

15 Claims, 8 Drawing Sheets

BALANCING A DATA PROCESSING LOAD AMONG A PLURALITY OF COMPUTE NODES IN A PARALLEL COMPUTER

BACKGROUND OF THE INVENTION

1. Field of the Invention

The field of the invention is data processing, or, more specifically, methods, apparatus, and products for balancing a data processing load among a plurality of compute nodes in a parallel computer.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

Large numbers of compute nodes connected through such networks are often utilized to process a large set of application data. To distribute the processing load across the compute nodes, an application executing on the compute nodes may divide the application data into smaller segments and assign a segment to each compute node for processing. Typically, an application divides the application data among the compute nodes such that each compute node has a segment of the same size for processing. The drawback to dividing the application data in such a manner is that such partitioning does not ensure that the processing load is evenly distributed among the nodes because the segment assigned to one compute node may require more processing than a similarly sized segment assigned to another compute node. Uneven distribution of the processing load across compute nodes inefficiently utilizes computing resources of a parallel computer because some of the resources are overburdened while other resources are underutilized.

SUMMARY OF THE INVENTION

Methods, apparatus, and products are disclosed for balancing a data processing load among a plurality of compute nodes in a parallel computer that include: partitioning application data for processing on the plurality of compute nodes into data chunks; receiving, by each compute node, at least one of the data chunks for processing; estimating, by each compute node, processing time involved in processing the data chunks received by that compute node for processing; and redistributing, by at least one of the compute nodes to at least one of the other compute nodes, a portion of the data chunks received by that compute node in dependence upon the processing time estimated by that compute node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
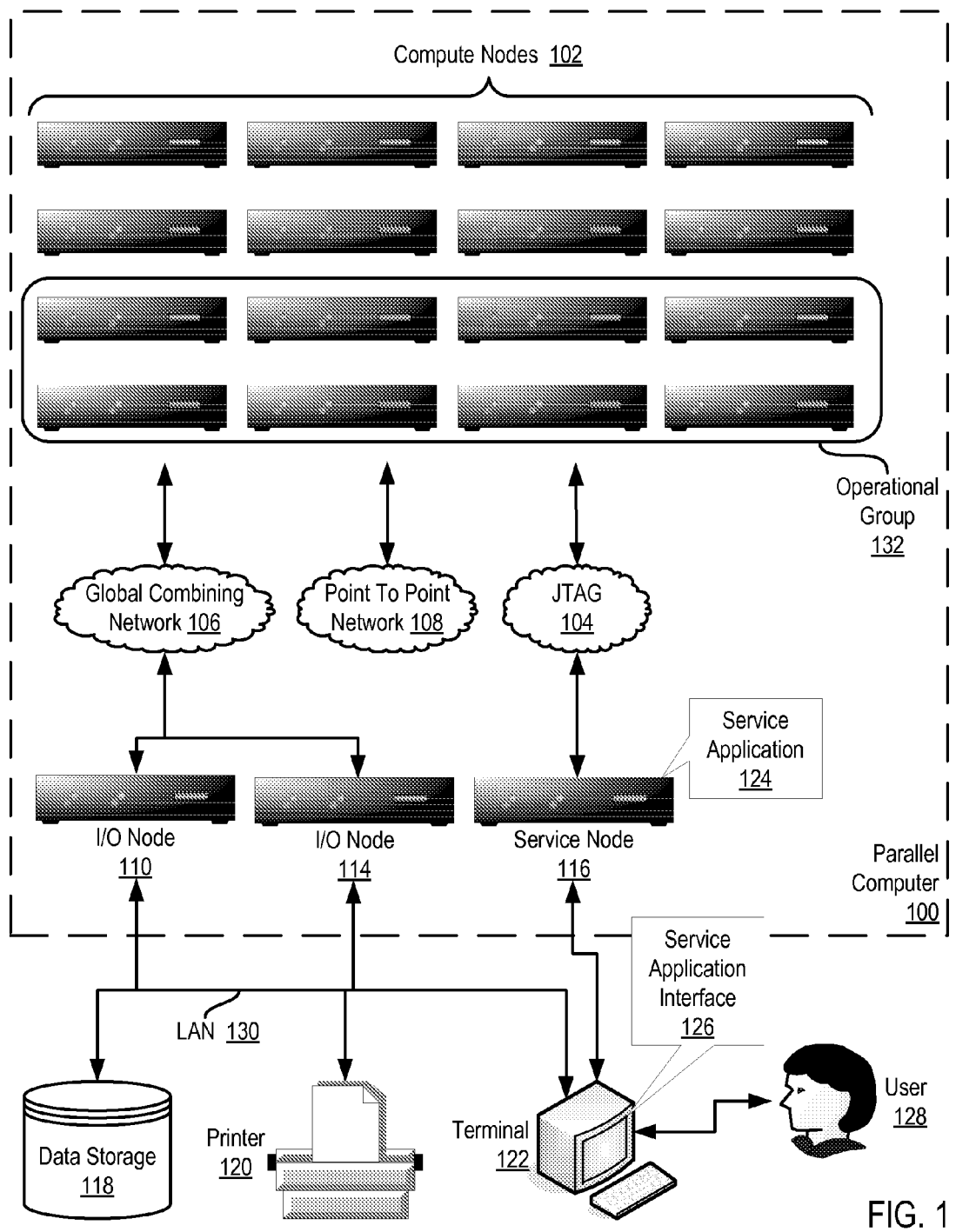
FIG. 1 illustrates an exemplary parallel computer for balancing a data processing load among a plurality of compute nodes according to embodiments of the present invention.

Exemplary methods, apparatus, and computer program products for balancing a data processing load among a plurality of compute nodes in a parallel computer according to embodiments of the present invention are described with reference to the accompanying drawings, beginning with FIG. 1. FIG. 1 illustrates an exemplary parallel computer for balancing a data processing load among a plurality of compute nodes according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) for executing an application that processes application data.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a point to point network (108) which is optimized point to point operations. The global combining network (106) is a data communications network that includes data communications links connected to the compute nodes so as to organize the compute nodes in a tree topology. Each data communications network is implemented with network links among the compute nodes (102). Each network link includes a physical transmission pathway between two adjacent compute nodes in network topology. That is, a network link directly connects two adjacent compute nodes in the network topology without the use of any intervening nodes. The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer (100) in FIG. 1 includes computer program instructions for balancing a data processing load among a plurality of compute nodes (102) in a parallel computer (100) according to embodiments of the present invention. The parallel computer (100) in FIG. 1 operate generally for balancing a data processing load among a plurality of compute nodes (102) in a parallel computer (100) according to embodiments of the present invention by: partitioning application data for processing on the plurality of compute nodes into data chunks; receiving, by each compute node, at least one of the data chunks for processing; estimating, by each compute node, processing time involved in processing the data chunks received by that compute node for processing; and redistributing, by at least one of the compute nodes to at least one of the other compute nodes, a portion of the data chunks received by that compute node in dependence upon the processing time estimated by that compute node. The application data refers to data that processed by application layer software that executes in parallel on the plurality of compute nodes (102).

The arrangement of nodes, networks, and I/O devices making up the exemplary system illustrated in FIG. 1 are for explanation only, not for limitation of the present invention. Data processing systems capable of balancing a data processing load among a plurality of compute nodes in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Balancing a data processing load among a plurality of compute nodes in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of balancing a data processing load among a plurality of compute nodes according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152).

Figure 2:
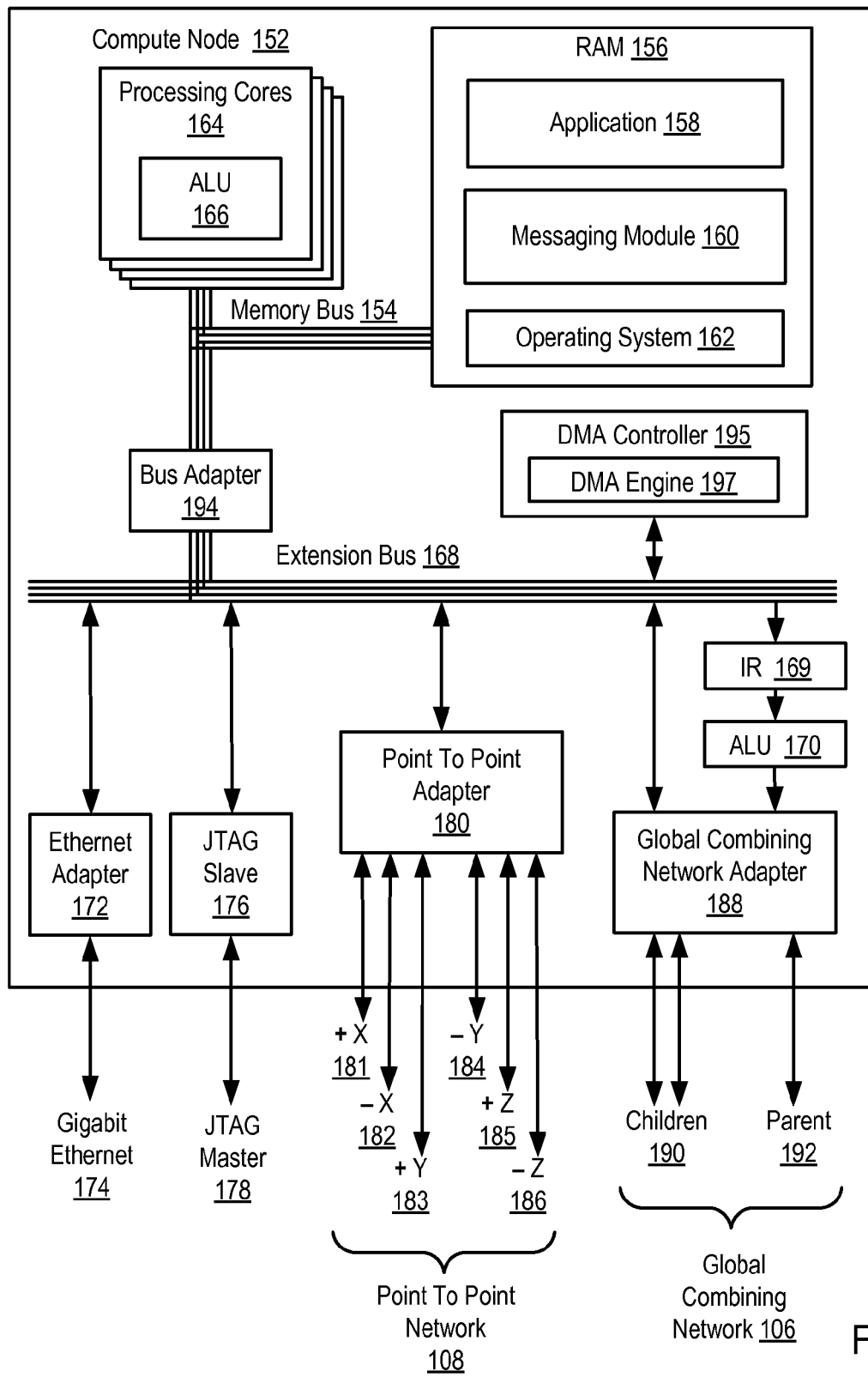
FIG. 2 sets forth a block diagram of an exemplary compute node useful in a parallel computer capable of balancing a data processing load among a plurality of compute nodes according to embodiments of the present invention.

Stored in RAM (156) of FIG. 2 is an application (158), a module of computer program instructions that carries out parallel, user-level data processing using parallel algorithms. The application (158) of FIG. 2 includes computer program instructions for balancing a data processing load among a plurality of compute nodes in a parallel computer according to embodiments of the present invention. The application (158) of FIG. 2 generally operates for balancing a data processing load among a plurality of compute nodes in a parallel computer according to embodiments of the present invention by: partitioning application data for processing on the plurality of compute nodes into data chunks; receiving at least one of the data chunks for processing; estimating processing time involved in processing the data chunks received by that compute node for processing; and redistributing, to at least one of the other compute nodes, a portion of the data chunks received in dependence upon the estimated processing time.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for balancing a data processing load among a plurality of compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in balancing a data processing load among a plurality of compute nodes in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
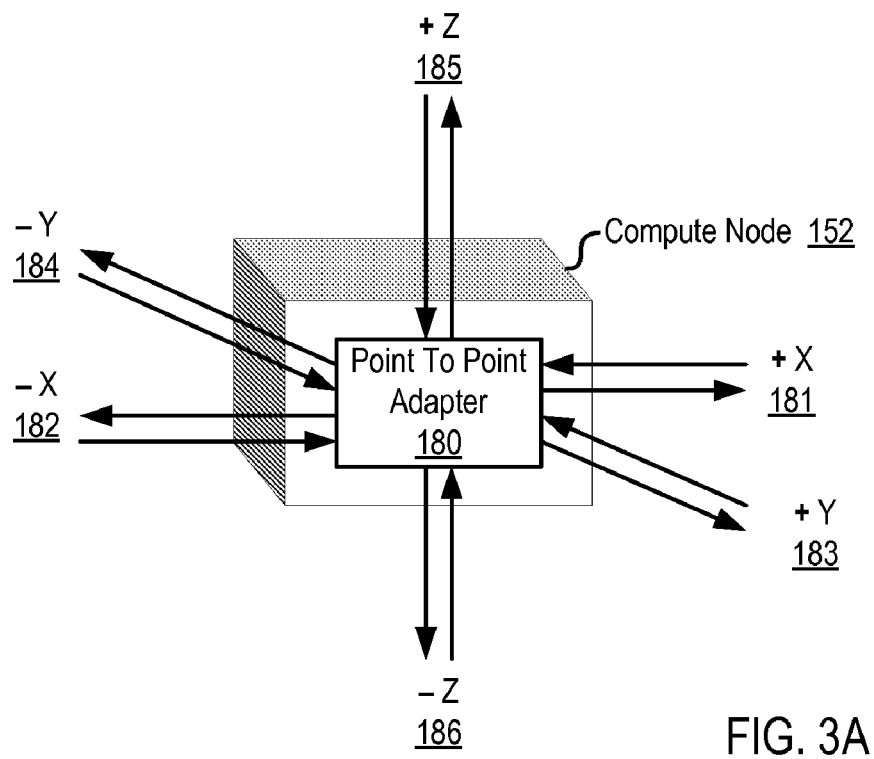
FIG. 3A illustrates an exemplary Point To Point Adapter useful in a parallel computer capable of balancing a data processing load among a plurality of compute nodes according to embodiments of the present invention.

For further explanation, FIG. 3A illustrates an exemplary Point To Point Adapter (180) useful in a parallel computer capable of balancing a data processing load among a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
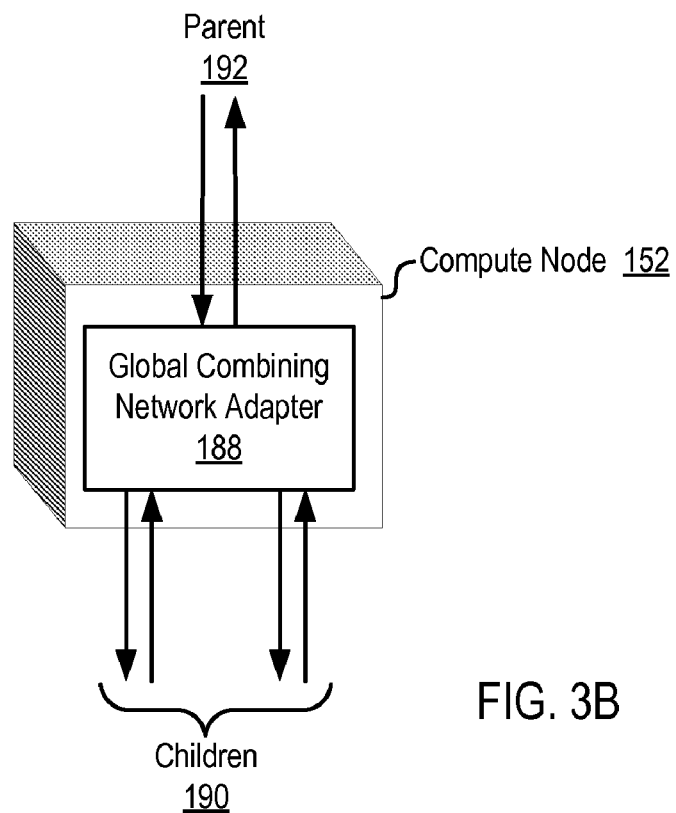
FIG. 3B illustrates an exemplary Global Combining Network Adapter useful in a parallel computer capable of balancing a data processing load among a plurality of compute nodes according to embodiments of the present invention.

For further explanation, FIG. 3B illustrates an exemplary Global Combining Network Adapter (188) useful in a parallel computer capable of balancing a data processing load among a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
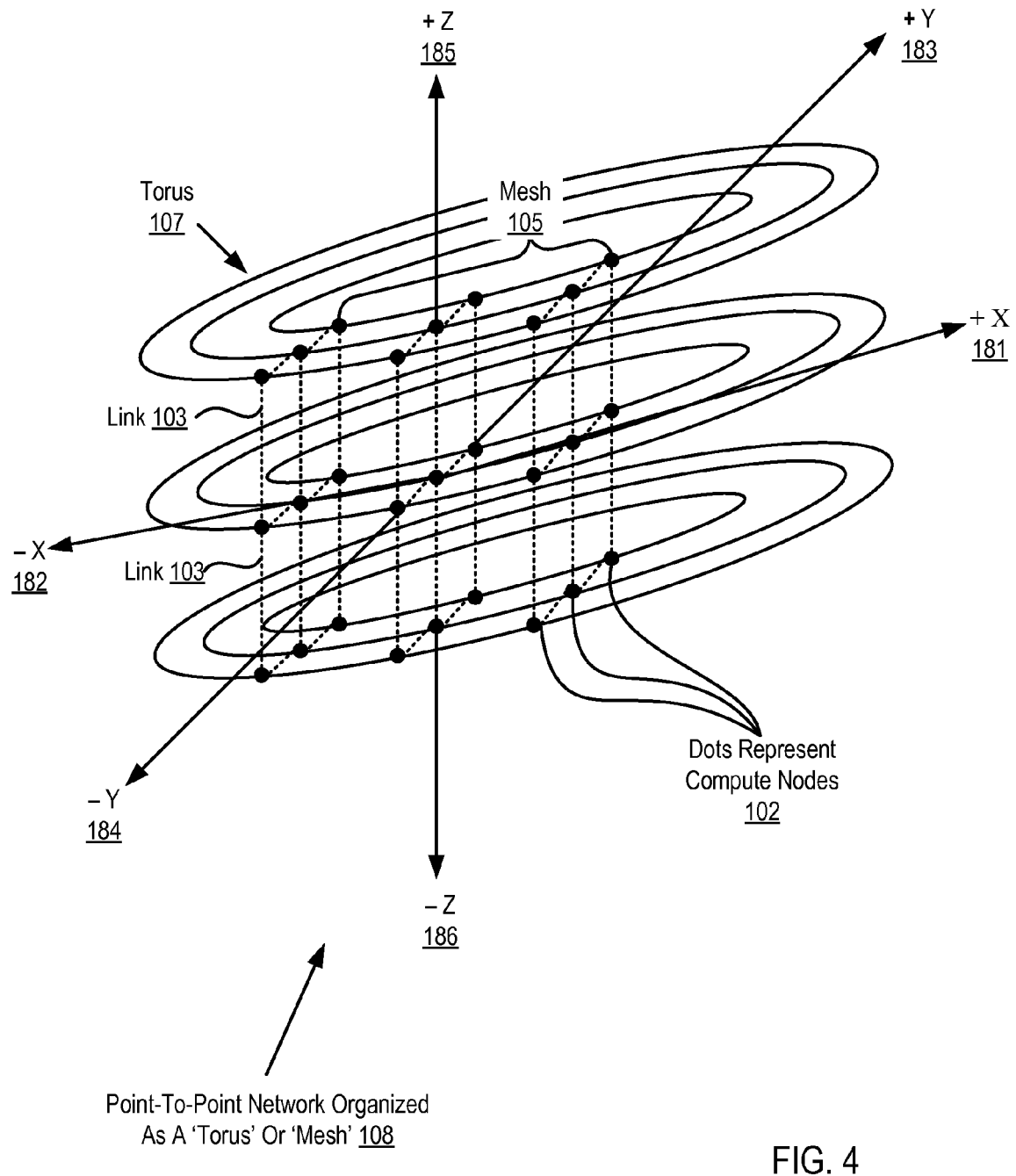
FIG. 4 sets forth a line drawing illustrating an exemplary data communications network optimized for point to point operations useful in a parallel computer capable of balancing a data processing load among a plurality of compute nodes according to embodiments of the present invention.

For further explanation, FIG. 4 sets forth a line drawing illustrating an exemplary data communications network (108) optimized for point to point operations useful in a parallel computer capable of balancing a data processing load among a plurality of compute nodes in accordance with embodiments of the present invention. In the example of FIG. 4, dots represent compute nodes (102) of a parallel computer, and the dotted lines between the dots represent network links (103) between compute nodes. The network links are implemented with point to point data communications adapters similar to the one illustrated for example in FIG. 3A, with network links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in balancing a data processing load among a plurality of compute nodes in a parallel computer in accordance with embodiments of the present invention may contain only a few compute nodes or may contain thousands of compute nodes.

Figure 5:
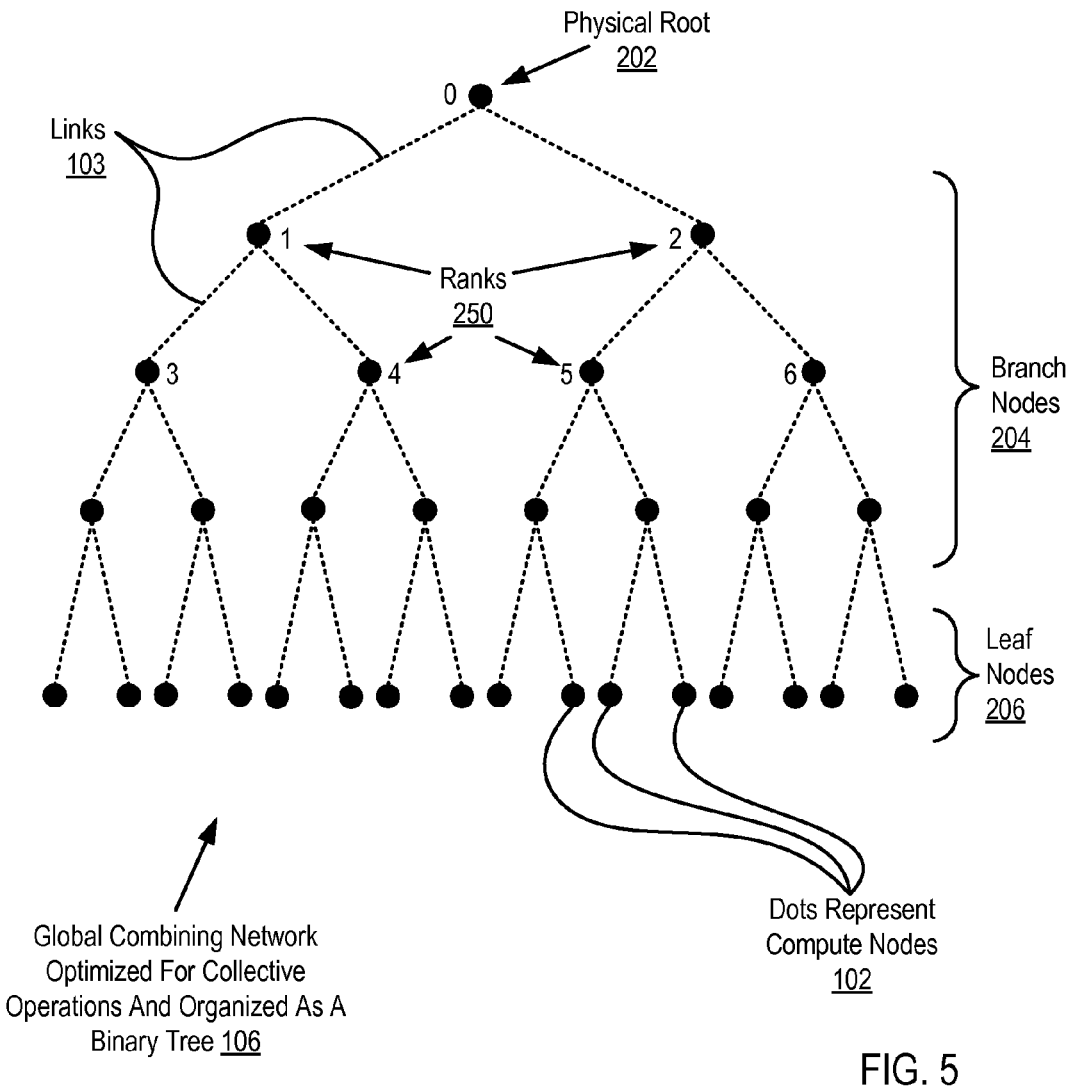
FIG. 5 sets forth a line drawing illustrating an exemplary data communications network optimized for collective operations useful in a parallel computer capable of balancing a data processing load among a plurality of compute nodes according to embodiments of the present invention.

For further explanation, FIG. 5 sets forth a line drawing illustrating an exemplary data communications network (106) optimized for collective operations useful in a parallel computer capable of balancing a data processing load among a plurality of compute nodes in accordance with embodiments of the present invention. The example data communications network of FIG. 5 includes network links connected to the compute nodes so as to organize the compute nodes as a tree. In the example of FIG. 5, dots represent compute nodes (102) of a parallel computer, and the dotted lines (103) between the dots represent network links between compute nodes. The network links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for balancing a data processing load among a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
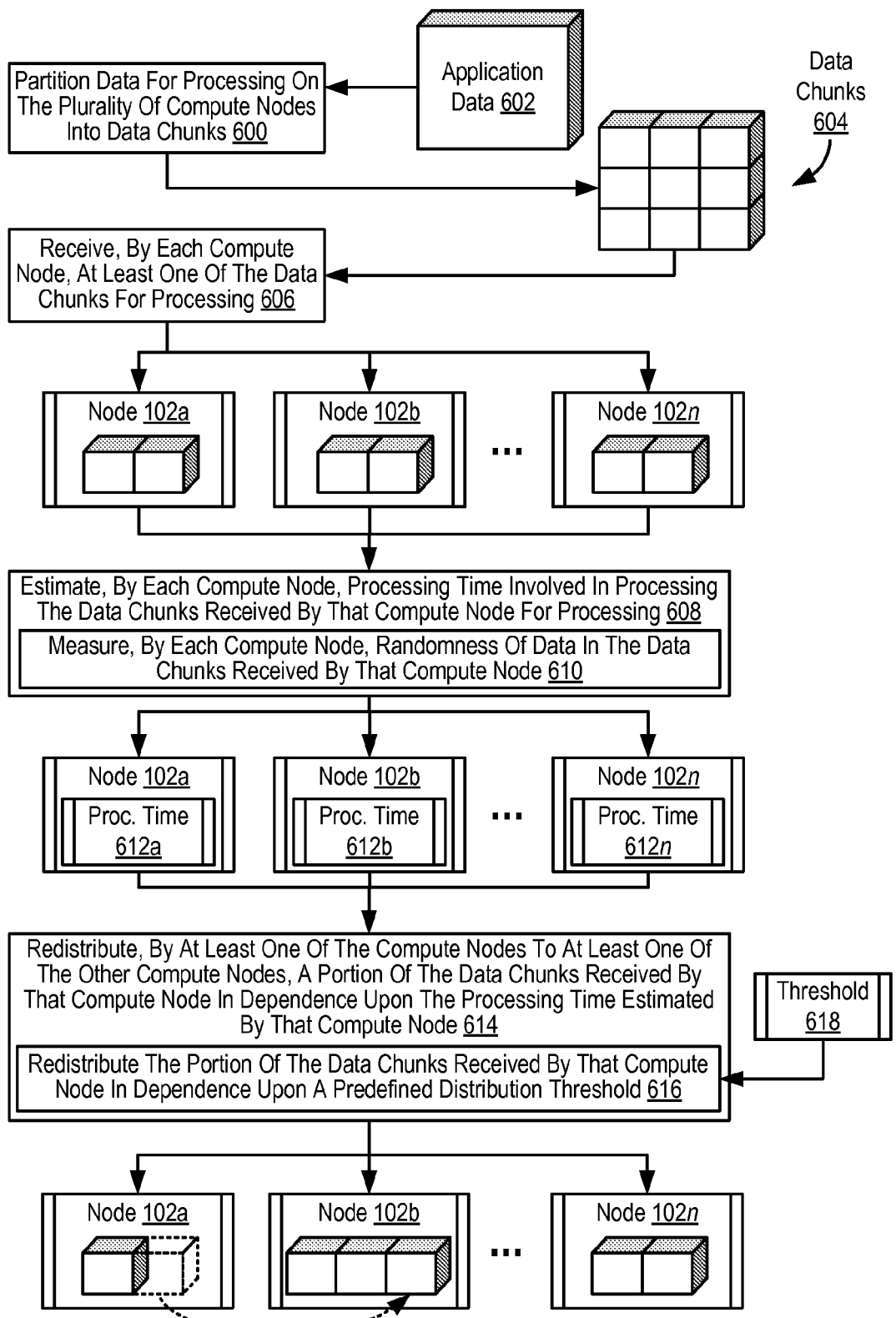
FIG. 6 sets forth a flow chart illustrating an exemplary method for balancing a data processing load among a plurality of compute nodes in a parallel computer according to embodiments the present invention.

For further explanation, FIG. 6 sets forth a flow chart illustrating an exemplary method for balancing a data processing load among a plurality of compute nodes in a parallel computer according to embodiments the present invention. The compute nodes (102) of FIG. 6 are connected using a plurality of data communications networks. At least one of the data communications networks is optimized for point to point operations, and at least one of the data communications networks is optimized for collective operations.

The method of FIG. 6 includes partitioning (600) application data (602) for processing on the plurality of compute nodes (102) into data chunks (604). Partitioning (600) application data (602) for processing on the plurality of compute nodes (102) into data chunks (604) according to the method of FIG. 6 may be carried out by a parallel application executing on the compute nodes (102) of the parallel computer or by a service node that administers application execution on the computer nodes (102) of the parallel computer. The application may partition (600) application data (602) for processing on the plurality of compute nodes (102) into data chunks (604) according to the method of FIG. 6 by dividing the application data (602) into equal-size data chunks (604). For further explanation, consider an example in which application data takes the form of digital video and the compute nodes execute an application that encodes digital video using MPEG audio and video encoding standards. 'MPEG' refers to the Moving Picture Experts Group, which is a working group of the International Organization for Standardization charged with the development of video and audio encoding standards. In such an example, the application may divide the digital video into segments such that each segment has the same number of frames.

The method of FIG. 6 includes receiving (606), by each compute node (102), at least one of the data chunks (604) for processing. Each compute node (102) may receive (606) at least one of the data chunks (604) for processing according to the method of FIG. 6 as part of a point to point operation such as, for example, the 'MPI_SEND' operation specified in the MPI specification. In some other embodiments, each compute node (102) may receive (606) at least one of the data chunks (604) for processing according to the method of FIG. 6 as part of a collective operation such as, for example, the 'MPI_SCATTER' operation specified in the MPI specification.

The method of FIG. 6 includes estimating (608), by each compute node (102), processing time (612) involved in processing the data chunks (604) received by that compute node for processing. The processing time (612) of FIG. 6 represents an indication of the time taken by a particular compute node to process the data chunks (604) received by that particular compute node. The processing time (612) may be implemented directly as a time value such as, for example, '2 seconds.' The processing time (612) however may also be implemented as an indirect value used as a proxy for time such as, for example, a value indicating that the information in the data chunk is highly randomized, which requires additional processing in some applications that process the information.

In the method of FIG. 6, estimating (608), by each compute node (102), processing time (612) involved in processing the data chunks (604) received by that compute node for processing includes measuring (610), by each compute node (102), randomness of data in the data chunks (604) received by that compute node. Measuring (610) randomness of data in the data chunks (604) received by that compute node provides an indication of the time taken by a particular compute node to process the data chunks (604) received by that particular compute node when more randomized data takes longer to process than data that is less randomized. Consider again the example in which application data takes the form of digital video and the compute nodes execute an application that encodes digital video using MPEG audio and video encoding standards. Encoding two sequential frames of a digital video requires more processing time when the two frames capture two different scenes than when the two frames capture the same scene. The additional processing time that is required results from the way in which the MPEG encoding algorithm operates on the frames. Generally, the MPEG encoding algorithm only encodes data for a frame that has changed from the previous frame. In the case of an MPEG encoding algorithm therefore, the more random the data contained in each frame with respect to the previous frame, the more processing time that is generally required to encode the frame using an MPEG encoding algorithm.

Each compute node (102) may measure (610) randomness of data in the data chunks (604) received by that compute node according to the method of FIG. 6 by determining the compression ratio when compressing the data chunks received by that compute node using a lossless data compression algorithm such as, for example, the deflate compression algorithm specified in RFC 1951 and popularized by Phil Katz's ZIP archiving utility. A high level of compression using a lossless data compression algorithm typically indicates a low level of data randomization with the data chunks, while a low level of compression using a lossless data compression algorithm typically indicates a high level of data randomization with the data chunks.

Readers will note that other ways of estimating (608), by each compute node (102), processing time (612) involved in processing the data chunks (604) received by that compute node may also be useful according to embodiments of the present invention. For example, consider a parallel application that calculates the stable energy point of a molecular system. The application data processed by such an application may be implemented as a molecular mechanics model of the molecular system. Each compute node could estimate the processing time involved in processing the data chunks by estimating the dihedral bond angles specified in the portion of the overall system model that the compute node received. More sterically hindered dihedral bonds indicate that more simulations—that is, more processing—are required to discover the stable energy point for the portion of the molecular system processed by that particular compute node. In such an example, therefore, calculating the dihedral bond angle for the portion of the molecular system model received by a compute node is the manner in which that compute node may estimate the processing time involved in processing the data chunk received by that compute node.

The method of FIG. 6 also includes redistributing (614), by at least one of the compute nodes (102) to at least one of the other compute nodes (102), a portion of the data chunks (604) received by that compute node (102) in dependence upon the processing time (612) estimated by that compute node. A compute node (102) redistributes (614) a portion of the data chunks (604) received by that compute node (102) according to the method of FIG. 6 by redistributing (616) the portion of the data chunks (604) received by that compute node in dependence upon the processing time (612) estimated by that compute node and a predefined distribution threshold (618). The predefined distribution threshold (618) of FIG. 6 represents a benchmark value that each compute node may compare with the processing time (612) estimated by that compute node to determine whether to redistribute a portion of the data chunks (604) received by that compute node. In addition to specifying a benchmark value, the predefined distribution threshold (618) may also specify the size of the portion to be distributed. The predefined distribution threshold (618) of FIG. 6 may be the same for all of the compute nodes or individually tailored for each compute node by an application developer. Individually tailoring the predefined distribution threshold (618) to each compute node may be useful for embodiments in which some of the compute nodes' processing resources are split between two or more applications. In such embodiments, the predefined distribution threshold for those compute nodes may be lower than the predefined distribution threshold for other compute nodes dedicated exclusively to executing the application because the compute nodes split between two or more application generally have less processing resources to devote to any one application.

At least one of the compute nodes (102) may redistribute (616) the portion of the data chunks (604) received by that compute node according to the method of FIG. 6 using a collective operation such as, for example, an 'MPI_SCATTER' operation or using a point to point operation such as, for example, an 'MPI_SEND' operation. In the example of FIG. 6, compute node (102a) redistributes a portion of the data chunks it received to compute node (102b). Although each compute node may initially receive the same amount of data in the form of data chunks, redistributing a portion of the data chunks in the manner described above allows a compute node to divest itself of part of the data chunks it received when those data chunks are estimated to create an processing load imbalance among the compute nodes processing the application data (602).

Figure 7:
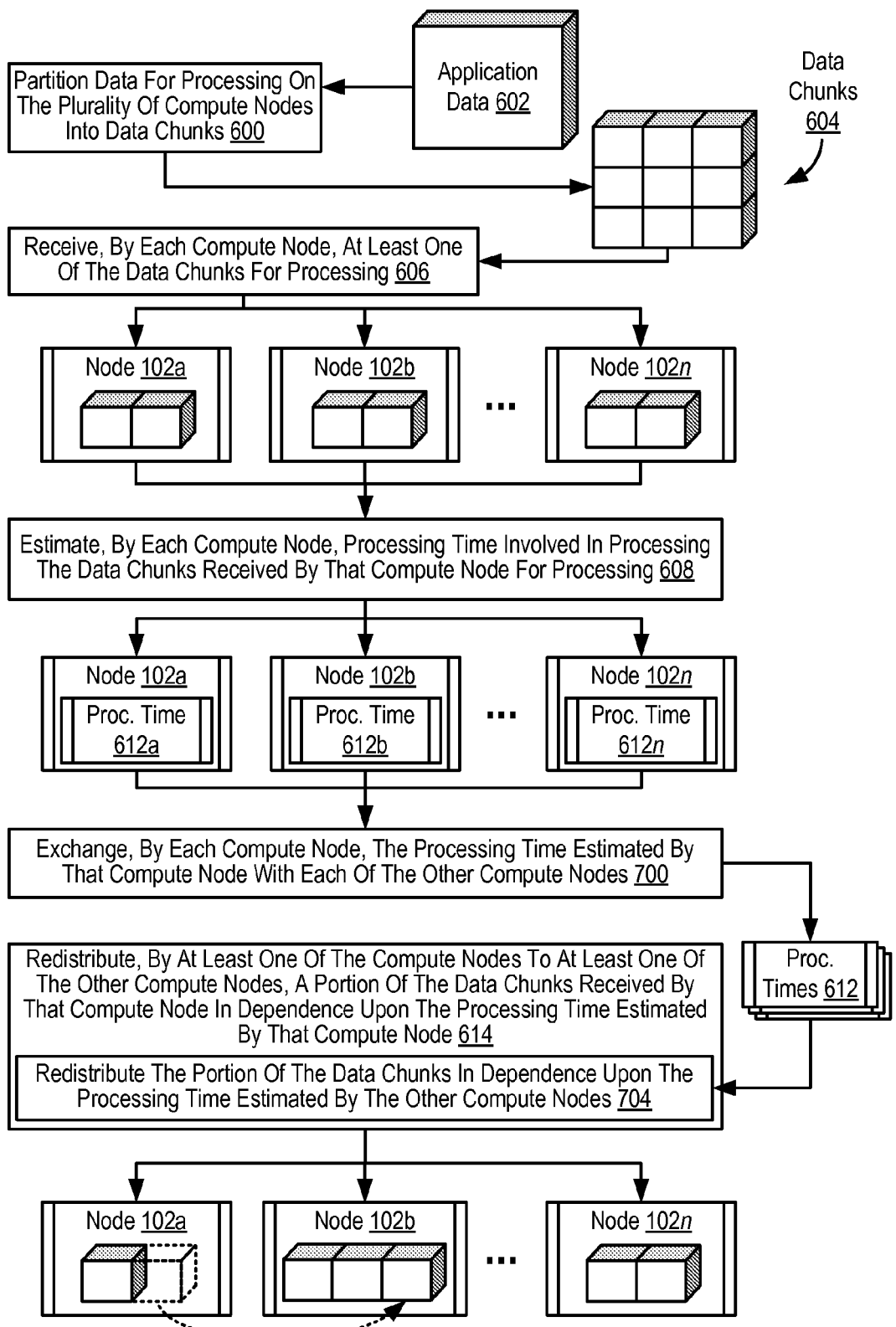
FIG. 7 sets forth a flow chart illustrating a further exemplary method for balancing a data processing load among a plurality of compute nodes in a parallel computer according to embodiments the present invention.

The explanation above with reference to FIG. 6 describes a compute node that redistributes a portion of the data chunks it received based on a predetermined distribution threshold. Using a predetermined distribution threshold, however, a particular compute node may not take into account the available processing resources of the other compute nodes to which the particular compute node redistributes a portion of the data chunks. Taking into account the available processing resources of the other compute nodes to which the particular compute node redistributes a portion of the data chunks may be useful in balancing the processing load among the compute nodes according to embodiments of the present invention. For further explanation, FIG. 7 sets forth a flow chart illustrating a further exemplary method for balancing a data processing load among a plurality of compute nodes in a parallel computer according to embodiments the present invention. The compute nodes (102) of FIG. 7 are connected using a plurality of data communications networks. At least one of the data communications networks is optimized for point to point operations, and at least one of the data communications networks is optimized for collective operations.

The method of FIG. 7 is similar to the method of FIG. 6. That is, the method of FIG. 7 includes: partitioning (600) application data (602) for processing on the plurality of compute nodes (102) into data chunks (604); receiving (606), by each compute node (102), at least one of the data chunks (604) for processing; estimating (608), by each compute node (102), processing time (612) involved in processing the data chunks (604) received by that compute node for processing; and redistributing (614), by at least one of the compute nodes (102) to at least one of the other compute nodes (102), a portion of the data chunks (604) received by that compute node (102) in dependence upon the processing time (612) estimated by that compute node.

The method of FIG. 7 also includes exchanging (700), by each compute node (102), the processing time (612) estimated by that compute node (102) with each of the other compute nodes (102). Exchanging (700), by each compute node (102), the processing time (612) estimated by that compute node (102) with each of the other compute nodes (102) according to the method of FIG. 7 may be carried out using a collective message passing operation such as, for example, the 'MPI_ALLTOALL' operation specified in the MPI family of specifications.

In the method of FIG. 7, a compute node (102) redistributes (614) a portion of the data chunks (604) received by that compute node (102) to at least one of the other compute nodes (102) by redistributing (704) the portion of the data chunks (604) received by that compute node (102) in dependence upon the processing time (612) estimated by that compute node (102) and the processing times (612) estimated by the other compute nodes (102). A compute node (102) may redistribute (704) the portion of the data chunks (604) received by that compute node (102) in dependence upon the processing time (612) estimated by that compute node (102) and the processing times (612) estimated by the other compute nodes (102) according to the method of FIG. 7 by determining that the estimated processing time (612) for that compute node (102) is higher than some of the other compute nodes (102), identifying a set of compute nodes having the lowest estimated processing times (612), and redistributing the portion of the data chunks (604) received by that compute node (102) to the compute nodes having the lowest estimated processing times (612). The compute node (102) may redistribute the portion of the data chunks (604) received by that compute node (102) to the compute nodes having the lowest estimated processing times (612) according to the method of FIG. 7 using a collective operation such as, for example an 'MPI_SCATTER' operation specified by the MPI family of specifications. In the example of FIG. 7, compute node (102*a*) determines that all of the other compute nodes (102) have estimated processing times that are lower than compute node (102*a*). Thus, compute node (102*a*) identifies compute node (102*b*) as the compute node having the lowest estimated processing time (612) and redistributes a portion of the data chunks (604) received by compute node (102*a*) to compute node (102*b*).

Figure 8:
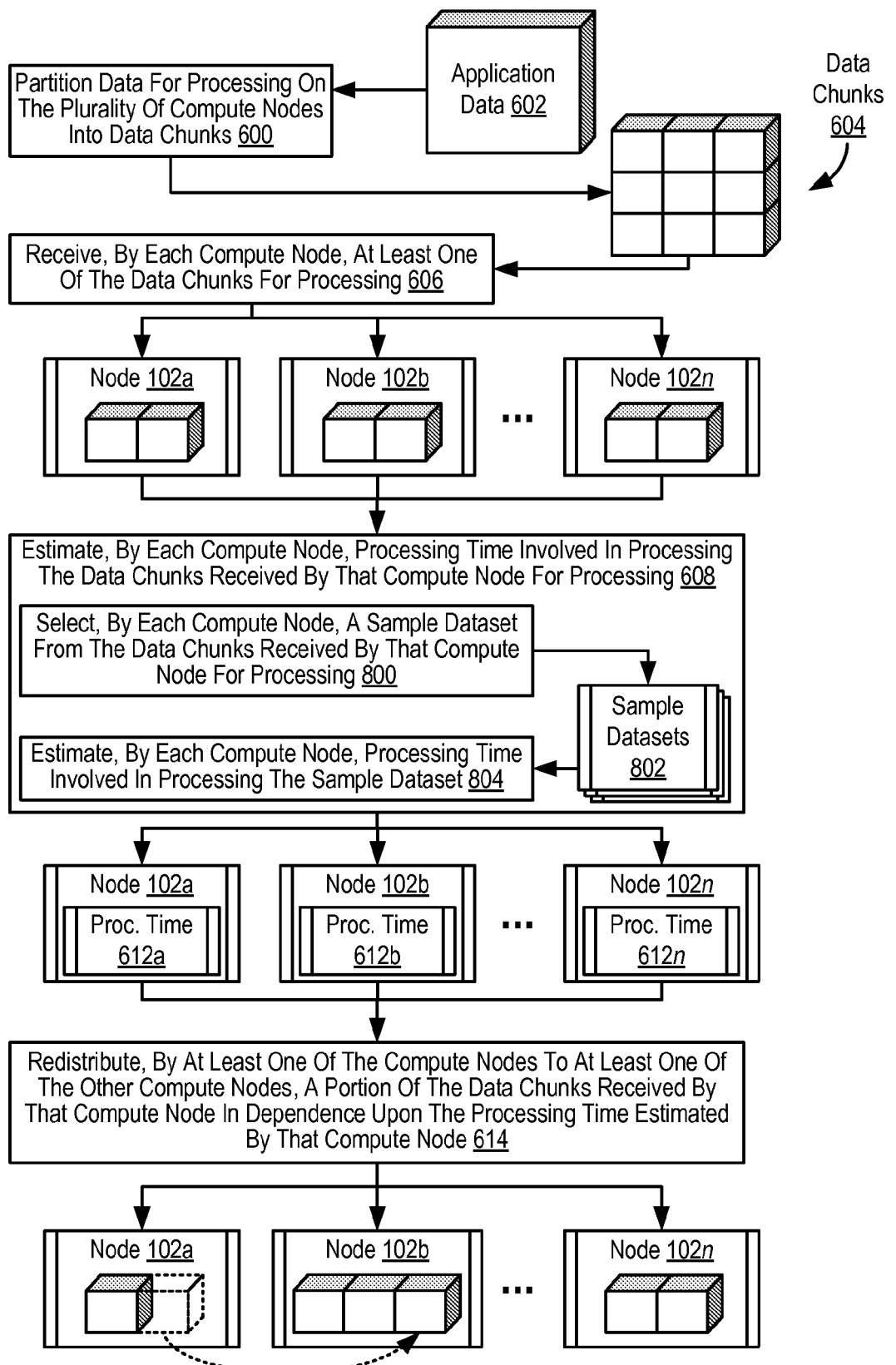
FIG. 8 sets forth a flow chart illustrating a further exemplary method for balancing a data processing load among a plurality of compute nodes in a parallel computer according to embodiments the present invention.

Readers will note that in some embodiments, estimating processing time involved in processing the data chunks received by each compute node may consume more processing resources than having each compute node actually process its respective data chunks. To reduce the processing burden of estimating processing time involved in processing the data chunks for each compute node, the compute nodes may estimate the processing time utilized to process the data chunks using a sample dataset from the data chunks. For further explanation, FIG. 8 sets forth a flow chart illustrating a further exemplary method for balancing a data processing load among a plurality of compute nodes in a parallel computer according to embodiments the present invention. The compute nodes (102) of FIG. 8 are connected using a plurality of data communications networks. At least one of the data communications networks is optimized for point to point operations, and at least one of the data communications networks is optimized for collective operations.

The method of FIG. 8 is similar to the methods of FIGS. 6 and 7. That is, the method of FIG. 8 includes: partitioning (600) application data (602) for processing on the plurality of compute nodes (102) into data chunks (604); receiving (606), by each compute node (102), at least one of the data chunks (604) for processing; estimating (608), by each compute node (102), processing time (612) involved in processing the data chunks (604) received by that compute node for processing; and redistributing (614), by at least one of the compute nodes (102) to at least one of the other compute nodes (102), a portion of the data chunks (604) received by that compute node (102) in dependence upon the processing time (612) estimated by that compute node.

In the method of FIG. 8, however, estimating (608), by each compute node (102), processing time (612) involved in processing the data chunks (604) received by that compute node for processing includes selecting (800), by each compute node (102), a sample dataset (802) from the data chunks (604) received by that compute node (102) for processing. Each compute node (102) may select (800) a sample dataset (802) from the data chunks (604) received by that compute node (102) according to the method of FIG. 8 using any sampling algorithm as will occur to those of skill in the art such as, for example, a random sampling algorithm, systematic sampling algorithm, convenience sampling algorithm, and so on. In some other embodiments, the compute node or the service node that partitions the application data (602) into the data chunks (604) may also specify a subset of each data chunk (604) to serve as a sample dataset (802) for that data chunk. In such embodiments, each compute node (102) may select (800) a sample dataset (802) from the data chunks (604) received by that compute node (102) according to the method of FIG. 8 by identifying, as the sample dataset (802), the subset of the data chunks (604) specified by the node partitioning the application data (602) into data chunks (604).

Estimating (608), by each compute node (102), processing time (612) involved in processing the data chunks (604) received by that compute node according to the method of FIG. 8 also includes estimating (804), by each compute node (102), processing time (612) involved in processing the sample dataset (802). Each compute node (102) may estimate (804) the processing time (612) involved in processing the sample dataset (802) according to the method of FIG. 8 by measuring (610) the randomness of data in the sample dataset (802) selected by that compute node. As mentioned above, each compute node (102) may measure (610) the randomness of data in the sample dataset (802) by determining the compression ratio when compressing the sample dataset (802) using a lossless data compression algorithm. Low levels of compression using a lossless data compression algorithm typically indicate a high level of data randomization with the sample dataset, thereby indicating that the data chunk from which the dataset is selected may require more processing than other data chunks.

Exemplary embodiments of the present invention are described largely in the context of a fully functional parallel computer system for balancing a data processing load among a plurality of compute nodes in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of balancing a data processing load among a plurality of compute nodes in a parallel computer, the method comprising:

partitioning application data for processing on the plurality of compute nodes into data chunks;

receiving, by each compute node, at least one of the data chunks for processing;

estimating, by each compute node, processing time involved in processing the data chunks received by that compute node for processing, including measuring, by each compute node, randomness of data in the data chunks received by that compute node, wherein the randomness of data in the same dataset is determined by the compression ration when compressing the sample dataset using a lossless data compression algorithm; and redistributing, by at least one of the compute nodes to at least one of the other compute nodes, a portion of the data chunks received by that compute node in dependence upon the processing time estimated by that compute node.

2. The method of claim 1 wherein:

the method further comprises exchanging, by each compute node, the processing time estimated by that compute node with each of the other compute nodes; and redistributing, by at least one of the compute nodes to at least one of the other compute nodes, a portion of the data chunks received by that compute node in dependence upon the processing time estimated by that compute node further comprises redistributing the portion of the data chunks received by that compute node in dependence upon the processing time estimated by that compute node and the processing times estimated by the other compute nodes.

3. The method of claim 1 wherein redistributing, by at least one of the compute nodes to at least one of the other compute nodes, a portion of the data chunks received by that compute node in dependence upon the processing time estimated by that compute node further comprises redistributing the portion of the data chunks received by that compute node in dependence upon the processing time estimated by that compute node and a predefined distribution threshold.

4. The method of claim 1 wherein estimating, by each compute node, processing time involved in processing the data chunks received by that compute node for processing further comprises:

selecting, by each compute node, a sample dataset from the data chunks received by that compute node for processing; and estimating, by each compute node, processing time involved in processing the sample dataset.

5. The method of claim 1 wherein the plurality of compute nodes are connected using a plurality of data communications networks, at least one of the data communications networks optimized for point to point operations, and at least one of the data communications networks optimized for collective operations.

6. A parallel computer for balancing a data processing load among a plurality of compute nodes in the parallel computer, the parallel computer comprising a plurality of computer processors and computer memory operatively coupled to the computer processors, the computer memory having disposed within it computer program instructions capable of:

partitioning application data for processing on the plurality of compute nodes into data chunks;

receiving, by each compute node, at least one of the data chunks for processing;

estimating, by each compute node, processing time involved in processing the data chunks received by that compute node for processing, including measuring, by each compute node, randomness of data in the data chunks received by that compute node, wherein the randomness of data in the same dataset is determined by the compression ration when compressing the sample dataset using a lossless data compression algorithm; and redistributing, by at least one of the compute nodes to at least one of the other compute nodes, a portion of the data chunks received by that compute node in dependence upon the processing time estimated by that compute node.

7. The parallel computer of claim 6 wherein:

the computer memory has disposed within it computer program instructions capable of exchanging, by each compute node, the processing time estimated by that compute node with each of the other compute nodes; and redistributing, by at least one of the compute nodes to at least one of the other compute nodes, a portion of the data chunks received by that compute node in dependence upon the processing time estimated by that compute node further comprises redistributing the portion of the data chunks received by that compute node in dependence upon the processing time estimated by that compute node and the processing times estimated by the other compute nodes.

8. The parallel computer of claim 6 wherein redistributing, by at least one of the compute nodes to at least one of the other compute nodes, a portion of the data chunks received by that compute node in dependence upon the processing time estimated by that compute node further comprises redistributing the portion of the data chunks received by that compute node in dependence upon the processing time estimated by that compute node and a predefined distribution threshold.

9. The parallel computer of claim 6 wherein estimating, by each compute node, processing time involved in processing the data chunks received by that compute node for processing further comprises:

selecting, by each compute node, a sample dataset from the data chunks received by that compute node for processing; and estimating, by each compute node, processing time involved in processing the sample dataset.

10. The parallel computer of claim 6 wherein the plurality of compute nodes are connected using a plurality of data communications networks, at least one of the data communications networks optimized for point to point operations, and at least one of the data communications networks optimized for collective operations.

11. A computer program product for balancing a data processing load among a plurality of compute nodes in a parallel computer, the computer program product disposed upon a computer readable non-transmission medium, the computer program product comprising computer program instructions capable of:

partitioning application data for processing on the plurality of compute nodes into data chunks;

receiving, by each compute node, at least one of the data chunks for processing;

estimating, by each compute node, processing time involved in processing the data chunks received by that compute node for processing, including measuring, by each compute node, randomness of data in the data chunks received by that compute node, wherein the randomness of data in the same dataset is determined by the compression ration when compressing the sample dataset using a lossless data compression algorithm; and redistributing, by at least one of the compute nodes to at least one of the other compute nodes, a portion of the data chunks received by that compute node in dependence upon the processing time estimated by that compute node.

12. The computer program product of claim 11 wherein:
the computer program product further comprises computer program instructions capable of exchanging, by each compute node, the processing time estimated by that compute node with each of the other compute nodes; and
redistributing, by at least one of the compute nodes to at least one of the other compute nodes, a portion of the data chunks received by that compute node in dependence upon the processing time estimated by that compute node further comprises redistributing the portion of the data chunks received by that compute node in dependence upon the processing time estimated by that compute node and the processing times estimated by the other compute nodes.

13. The computer program product of claim 11 wherein redistributing, by at least one of the compute nodes to at least one of the other compute nodes, a portion of the data chunks received by that compute node in dependence upon the processing time estimated by that compute node further comprises redistributing the portion of the data chunks received by that compute node in dependence upon the processing time estimated by that compute node and a predefined distribution threshold.

14. The computer program product of claim 11 wherein estimating, by each compute node, processing time involved in processing the data chunks received by that compute node for processing further comprises:
selecting, by each compute node, a sample dataset from the data chunks received by that compute node for processing; and
estimating, by each compute node, processing time involved in processing the sample dataset.

15. The computer program product of claim 11 wherein the plurality of compute nodes are connected using a plurality of data communications networks, at least one of the data communications networks optimized for point to point operations, and at least one of the data communications networks optimized for collective operations.

* * * * *